United States Patent Office 3,567,547
Patented Mar. 2, 1971

3,567,547
METHOD OF PROVIDING THIN GLASS PARTS OF PRECISE DIMENSIONS
John R. Mattson, 162 S. Wabasha 55107, and Roy D. Mattson, 415 Minnesota Ave. 55113, both of St. Paul, Minn.
No Drawing. Filed June 22, 1967, Ser. No. 647,901
Int. Cl. B32b 31/00
U.S. Cl. 156—247         5 Claims

ABSTRACT OF THE DISCLOSURE

A method of machining thin glass parts with precise dimensions including applying an abrasive resistant coating to the parts and forming the parts into a solid block by providing an adhesive therebetween. The parts can then be precisely machined, after which the parts are separated by removing the adhesive with a first solvent, which first solvent does not affect the abrasive resistant coating. Immediately prior to use the abrasive resistant coating can be removed through the use of a second solvent.

BACKGROUND OF THE INVENTION

This invention pertains to thin glass parts, such as substrates for use in electronics and the like, and a method of producing the same and more particularly to a method of producing glass parts having very precise dimensions and no defects in the surfaces thereof due to handling.

While it is apparent that there are many uses for thin glass parts, the use of these parts in electronics as a substrate will be stressed because of the exacting requirements as to dimensions, surface perfection, etc. However, it should be understood that the description of the use of these thin glass parts as a substrate is not intended to limit the scope of this invention in any way.

The term substrate as employed herein will be understood to describe thin glass parts having very precise dimensions and a high degree of surface perfection, which are utilized in the present day electronics industry and especially in the computer art as a base to receive and support controlled deposits of conducting and magnetic materials. The resulting fabricated electronic components may be assembled to comprise rapid access memory units for computers and the like.

It is extremely important that the major surfaces (defined as the larger surfaces and not including the edges) of these glass parts have no defects thereon. Even the slightest groove, caused by a speck of dust being ground into the surface with the fingers during handling, can cause ultimate malfunction or breakdown of the electronic component. Immediately prior to deposition of materials, especially magnetic substances, by the electronic industry the surfaces of the glass parts are inspected by light diffusion methods, which indicate even the minutest defects by a blue streak reflection, and any glass part having such a defect in the surface thereof is rejected. At the present time in all processes other than that of the present invention, the rejection rate due to the foregoing types of defect is very high.

In addition to retaining the major surfaces free of defects, the process of this invention also permits very precise dimensioning of the glass parts to be achieved by way of machining, fine grinding and polishing the edges of the parts while they are assembled in stacks as described below. It should be noted that when dimensions are referred to throughout this specification the thickness of the glass part is not included since that remains constant and it is dictated by the thickness of the sheets of glass purchased commercially or otherwise obtained prior to machining, grinding and polishing the edges to the desired size.

When glass parts are cut from a larger sheet or when the edges are machine ground, many small nicks and grooves are prevalent therein. These nicks and grooves in the edges of the glass parts are weak spots which cause the glass parts to break very easily if a bending stress is applied to the glass part along a line including one of the nicks or grooves. In the present invention the edges of the glass parts are finely ground and polished to remove all nicks and grooves thereby rendering the glass parts highly flexible and sturdy relative to the prior art parts.

It is an object of the present invention to provide a process for producing thin glass parts wherein the percentage of rejects is greatly reduced.

It is further an object of the present invention to provide novel intermediate products and final products utilizing the process of this invention.

It is a further object of the present invention to provide a process for producing, and a product including, thin glass parts which are substantially stronger than parts produced by any prior art process.

It is a further object of the present invention to provide a process for producing thin glass parts having very precise dimensions and for protecting the surfaces so that the percentage of rejects because of defects therein due to handling of the parts is greatly reduced.

These and other objects of this invention will become apparent to those skilled in the art upon consideration of the accompanying specification and claims.

DESCRIPTION OF THE PREFERRED EMBODIMENT

In the present process large sheets of glass having the required thickness and major surface perfection are provided by methods not necessarily a part of this invention. These large sheets of glass may be purchased commercially or manufactured by utilizing any of the methods well known to those skilled in the art. Although the present process may be utilized for producing various thin glass parts, as previously stated, it is especially adapted for producing glass substrates utilized in the electronic industry. It should be understood that minor changes in the process may be made by those skilled in the art and such damages will still come within the scope of this invention.

In the production of glass substrates the sheets of glass provided have a thickness of approximately three thousandths of an inch. Before the sheets of glass are handled or any further steps in the process are taken, a coating of abrasive-resistant material is applied to the sheets to protect the major surfaces from defects, such as scratches, pitting, etc., due to handling and to render immobile any loose particles on the surface of the sheets. For this purpose an abrasive resistant material will be understood to be a coatable film-forming substance which resists penetration by abrasive substances, thus preventing, inhibiting or reducing the frequency of contacts between the major surfaces of the glass substrate and the adventitious abrasive particles. In general the abrasive-resistant material should be easily soluble in a solvent, described below as the first-solvent, so that it may be quickly cleaned from the final glass parts before they are utilized as substrates in electronic components. For convenience an abrasive-resistant material which is soluble in water, such as polyvinyl alcohol or the like, is utilized in the present embodiment.

It should be noted that polyvinyl alcohol is soluble in other materials also, some examples of which are ethyl alcohol, ethyl alcohol and water, etc. but water is preferred as the solvent because it is cheap, non-inflammable and non-toxic.

The abrasive-resistant material is applied to the surfaces of the sheets of glass in a film having a substantially uniform thickness in the range of fifty millionths to five thousandths of an inch. The thickness of the film of abrasive-resistant material is relatively important since too thin a film will not adequately protect the surface of the glass sheets and too thick a film will tend to hamper subsequent operations. For this reason the range one hundred millionths to one thousandth inch is preferred. It is desirable to have a relatively uniform thickness of film coated on the glass sheets for later operations, as will become apparent presently. Also, the film should be flexible and tough enough to add some strength to the glass sheets and to damp out destructive vibrations set up during machining and subsequent operations.

The abrasive-resistant material is normally, for the purposes of this invention, prepared initially in a liquid state, for example as a melt or as a solution in a suitable solvent such as the first-solvent, and may be applied in any of a variety of ways, such as dipping, spraying, etc. Though usually less desirable, it is even possible to apply it as a self-supporting film upon the thin glass sheet, said film then being rendered liquid or adherent by heating the assembly or treating it with a material such as the first solvent. The abrasive-resistant material in the liquid state has a given viscosity which can be altered by adding small portions of the first-solvent to make a more dilute solution. As the viscosity of the abrasive-resistant material is reduced by additions of solvent the final film thickness is reduced. Alternatively, the abrasive-resistant material may be applied as an emulsion of the latex type in a suitable nonsolvent liquid. After the abrasive-resistant material is applied to the glass sheet it is allowed to dry or solidify for a period of time depending upon the material used and the drying conditions.

After the glass sheets are coated and the abrasive-resistant material has had ample time to solidify, the sheets are cut, broken, sawed, or otherwise formed into glass parts having dimensions which are substantially larger than the desired dimensions. In the present embodiment the glass parts are rectangular shaped, having dimensions of several inches for their width and depth, although the parts may be formed in any desirable shape, such as circular, elliptical, odd, etc. Each of the glass parts has approximately the same dimensions for reasons which will be apparent presently; however, this may be altered somewhat under special conditions as will be explained presently.

When the coated glass sheets are all cut into glass parts a desired number of the parts are formed into stacks in the following manner. An adhesive is applied to the surface of a first glass part and a second glass part is placed in overlying relationship thereon. The adhesive is then applied to the upper surface of the second glass part and a third glass part is placed in overlying relationship thereon. This procedure is continued until a desired number of glass parts are formed into a stack. The number of parts in a stack is determined by the thickness of the individual parts and the stack thickness with which it is most convenient to work. Pressure is then applied to the stack to squeeze out the excess adhesive and to position each of the parts in approximate parallel relationship. As pressure is applied to the stack and the parts are positioned in the desired parallel relationship the adhesive is allowed to solidify thereby fixedly adhering the parts together. The pressure applied should preferably be continuous, since in many instances the adhesive will contract as it solidifies and otherwise leave voids between the parts; the pressure need be only sufficient to perform the stated functions. In some instances a pressure sensitive adhesive, which does not solidify, may be utilized. It should be understood that any adhesive may be utilized which forms an essentially rigid stack of parts for subsequent machining. In this manner a solid block of glass parts is produced for the subsequent steps.

Any adhesive which has sufficient strength may be utilized to hold the glass parts rigidly in stacks, provided that it is soluble in a solvent that does not dissolve the abrasive-resistant protective coating or may be melted or otherwise destroyed or removed preferably without damaging the protective coating. In general it is desirable to use an organo-soluble material, normally a thermoplastic system, with a melting or flow point somewhat below that of the abrasive-resistant material. The use of a thermoplastic system as the adhesive is desirable because of the convenience of disassembly of the parts in subsequent steps. In the present embodiment the adhesive utilized between parts is a wax of the microcrystalline type which is applied in the liquid or molten state. The wax is applied to the surface of the parts in the molten state and solidifies throughout the stack after approximately one hour at room temperature. Many other methods of application of the adhesive, for example from solution or as a film, may be utilized without departing from the scope of this invention.

After the glass parts are formed into proper sized stacks the sides of the stacks made up of the edges of the glass parts, are machine or rough-ground until the dimensions of the stacks are slightly larger than the precise dimensions desired. During the machine grinding the stacks normally must be cooled bp a coolant to prevent overheating and damage, such as partial melting or the like, to the edges of the glass parts as well as separation of the adhesive. However, it is very important that neither the abrasive-resistant material nor the adhesive are rapidly soluble in the coolant, since the stacks might separate during machine grinding. In the present embodiment the usual water base coolant is utilized but the additives may change the characteristics thereof sufficiently so that the abrasive-resistant material is relatively insoluble therein. Also, the adhesive utilized is preferably insoluble in the coolant, and tends to protect the abrasive-resistant coating. After the stacks are machine ground to a size slightly larger than the precise dimensions desired the sides of the stacks, composed of the edges of the glass parts, are fine-ground by hand or with a machine, such as a lapping machine, to within a few ten thousandths of an inch of the exact dimensions, after which they are polished to the exact dimensions. By fine-grinding and polishing the stacks to the precise dimensions all the nicks and grooves in the edges of the glass parts produced by cutting the parts and machine-grinding them, are substantially removed. Polishing the stacks to the precise dimension greatly adds to the toughness and flexibility of each of the glass parts since the faults in the edges of the parts are no longer present.

In particular cases the precision-ground and polished stacks may be desired for subsequent special operations ore for ruggedness in shipping or handling. In such cases the adhesive would not be removed but instead the stacks would be delivered as such. It should be noted that after machining, the edges of the thin glass parts in the stacks are exposed while the major surfaces are coated with the abrasive-resistant material which in turn has a coating of adhesive interspersed therebetween. Thus, operations such as plating, coating, painting, etc., can readily be performed on the edges of the parts without affecting the major surfaces when the parts are still in the stack form. After any subsequent operations are performed or after machining, if there are no further operations, the stacks are disassembled.

In the present embodiment the stacks are disassembled by heating to melt the wax and removing the glass parts preferably one at a time. The glass parts are then washed in an organic solvent, such as trichloroethane or the like, which removes all of the adhesive from the surfaces. The solvent utilized to wash the adhesive from the parts is dependent upon the adhesive utilized. However, in the preferred embodiment care must be taken to insure that the adhesive is soluble in a solvent or solvents which do not dissolve the abrasive-resistant material so that removing the adhesive will not remove the protective coating. Alternatively, the adhesive might in certain cases be allowed to remain provided that all traces of it can later be removed at the same time that the abrasive-resistant coating is removed. In such cases the solubility characteristics of the abrasive-resistant material and the adhesive may be similar, but it is necessary that the parts be separable by some other means. Examples of other means by which the parts coated with abrasive-resistant material and held together by the adhesive might be separable are: by selective melting of the adhesive, based on the two materials having different melting points, with the adhesive having the lower melting point; by utilizing a curable system which becomes relatively stiff or rigid upon solidifying or curing, and thus may be separated mechanically, melting or dissolving of the abrasive-resistant coating; etc. For purposes of this specification the term "curable system" is defined to include thermosetting resins, catalyzed resins and other adhesives which set up shortly after mixing of two or more components.

In the present embodiment the abrasive-resistant material and the adhesive have different melting points, as well as different solubility characteristics, so that the stacks may be disassembled by heating, as presently described, if desired. It is also possible to disassemble the stacks by simply soaking them for a sufficiently lengthy period in a solvent in which the adhesive is soluble. However, for purposes of expediency wax is utilized as an adhesive in the present embodiment so that the stacks may be quickly disassembled by simply melting the wax.

In another embodiment of the present invention a curable system (previously mentioned) which becomes relatively stiff or rigid upon curing, such as a polyester resin, may be utilized as the adhesive. While this material normally cannot be removed by a solvent or by heating, the glass parts can be separated mechanically, for example by utilizing a sharp instrument such as a knife blade. A polyester resin film for example has relatively low adhesion and peels from the protective coating relatively easily. The resin coating is peeled from the protective coating in a thin sheet leaving the glass parts with an abrasive-resistant protective coating on each major surface thereof. A stiff or rigid adhesive has several advantages in that it increases the rigidity of the stack of glass parts and allows more material to be removed from the edges during the machining steps with less damage to the individual glass parts and the edges are less likely to suffer contamination by waxy, greasy substances which may interfere in subsequent edge-coating or plating operations.

After the stacks are disassembled and the adhesive is removed from the separate glass parts the abrasive-resistant material may be removed by washing the glass parts in the first solvent, which in this case is water. However, in general the manufacturer of the glass substrate does not also produce the electronic components by deposition of appropriate materials thereon. Therefore, it is generally desirable to leave the protective coating on the surface of the separate glass parts until they are delivered to the electronic component manufacturer. At this time the components can be thoroughly cleansed in a water bath and placed directly in their assembly process with a minium of handling. Thus, the rejection rate of the glass substrates is greatly reduced since the major surfaces of the glass parts are never touched by machines, by contact with other glass parts, or by human hands.

This invention is further illustrated by the following specific example:

Example 1

A sheet of glass having a thickness of approximately three thousandths of an inch is coated on both of its major surfaces with a film of polyvinyl alcohol having a thickness of approximately one ten thousandth of an inch. The coating is applied by dipping the sheet of glass in a bath of polyvinyl alcohol solution. The thickness of the film of polyvinyl alcohol on the sheet of glass is determined by the viscosity of the solution, which is readily altered to produce the desired thickness of coating by small additions of water. The sheet of glass having the polyvinyl alcohol film thereon is allowed to dry or solidify in the air for from less than one to five hours, depending upon the conditions of the air (humidity, temperature, etc.) that prevail. After the film of polyvinyl alcohol is thoroughly dried the sheet of glass is cut into parts somewhat larger than the desired size. Although the size of these parts may vary with the different applications, in this example the desired size is two inches wide by four inches long and the parts are cut so that they are slightly wider than two and one-quarter inches and slightly longer than four and one-quarter inches.

After the parts are cut they are stacked in the following manner. A first part is coated on one surface with a microcrystalline type wax in the molten state and a second part is placed in an overlying position on the first part. The second part is coated with the microcrystalline type wax and a third part is placed in overlying relationship on it. This procedure is continued until approximately five hundred parts are included in the stack. The stack, which is warm enough so that the wax is liquid, is then placed under a continuous pressure of approximately one-fourth pound per square inch until the excess wax has been squeezed out and the remaining wax has completely solidified, which in this example is approximately one hour.

After the wax has solidified the rigid stack is rough-ground on the four sides which are made up of the edges of the glass parts by a surface grinder having approximately a 320 mesh diamond grit coated wheel. The rough grinding removes approximately one-quarter inch of material from the length and width of the stack, it being understood that the dimensions are appropriate for the subsequent steps. During rough-grinding a standard coolant made up of water and additives is utilized to prevent the edges of the glass parts from reaching the melting point and the wax adhesive from melting. Additives in the coolant, for example inorganic or organic salts, when added to water may form a solution in which the polyvinyl alcohol is not substantially soluble. After the stacks are rough-ground they are then fine-ground on a lapping machine with an abrasive having approximately a 12 micron grit size. This step is continued until approximately five thousandths on an inch have been removed from the length and width, the exact amount being determined by the desired dimensions and the subsequent steps. The stack is again fine-ground in the lapping machine with an abrasive having approximately a 9.5 micron grit size. In this step approximately another two thousandths of an inch is removed. A third fine grinding step is performed on the lapping machine with an abrasive having approximately a 5 micron grit size and approximately another one thousandth of an inch is removed from the length and width of the stack, this being sufficient to be well within one thousandth of an inch of the desired size so that the polishing step need not be unduly prolonged. It should be understood that additional grinding steps utilizing finer grit size compounds might be performed if a finer finish is desired. The four sides composed of the edges of the parts are then polished, utilizing a cerium oxide polishing compound, to attain the final desired smoothness of the edges. In the polishing step a sufficient amount of material is removed to bring the glass parts to the desired precise dimension. In general the amount of material removed during polishing is desirably one or two ten thousandths of an inch.

Besides the machining steps specified above, it may be desirable to perform additional or modified machining steps on the stacks. For example very precise openings can be formed in each of the glass parts by drilling, etc., these openings being precisely positioned with respect to one of the external edges and/or with respect to each other, in the event there are more than one in a part. Also, in particular instances it may be desirable to produce a predetermined gradation in the dimensions of the glass parts. This can readily be accomplished while the parts are in the stack by machining the edges at some predetermined angel relative to the plane of the parts. Thus, a rectangular or parallelepiped-shaped stack might be machined into a trapezoidal or "wedge-shaped" stack so that each successive part is slightly and controlledly smaller than the former part. This would be practically impossible to accomplish on an individual basis.

After the stacks are polished and the parts are the precise dimensions desired the stack is heated to a temperature sufficient to melt the wax and the parts are removed from the stack one at a time. The single parts are placed in a trichloroethane bath, preferably of the refluxing type if it is necessary as for thin-coating purposes that the finished parts be totally free of any traces of waxy or greasy contamination, to remove the wax from the surfaces of the coated parts. The parts are then ready for storage and/or shipping. To remove the polyvinyl alcohol abrasive-resistant film from each of the parts they are simply washed in clear pure water, preferably filtered water free of all contamination by abrasive particles. Normally this would also be distilled water, to prevent contamination of the major surfaces of the parts by inorganic or organic residues or deposits upon drying.

Example 2

As a second example all of the steps are similar to those described in Example 1 except the parts are washed in a solution made up of water and ethyl alcohol. This solution may vary between the ranges of substantially pure ethyl alcohol to substantially pure water.

Example 3

As a third example all of the steps are similar to those described in Example 1 except the adhesive utilized is an epoxy resin sold under the trademark EPON 828 and an amine, such as diethylenetriamine, in stoichiometric quantities. In this example the method of separating the parts after machining is to insert a sharp blade therebetween and apply a slightly transverse pressure.

This invention has been thoroughly tested and found completely satisfactory for the accomplishment of the above objects and, while we have shown and described a specific embodiment of this invention, further modifications and improvements will occur to those skilled in the art. We desire it to be understood, therefore, that this invention is not limited to the particular form shown.

What is claimed is:
1. A process of providing thin glass parts having very precise dimensions and no defects in the major surfaces comprising the steps of:
   (a) providing a large sheet of glass having the required thickness and surface perfection;
   (b) coating said sheet of glass with an abrasive resistant material soluble in a first solvent;
   (c) cutting said coated glass sheet into parts having dimensions substantially larger than the precise dimensions desired;
   (d) applying an adhesive to said coated parts and stacking said parts into a stack;
   (e) bringing said parts into a substantially parallel relationship and manipulating to expel entrapped air thereby forming an essentially rigid, substantially void-free block of material;
   (f) rough-grinding said stack of parts to slightly larger than the precise dimensions desired;
   (g) fine-grinding and polishing said stack to the precise dimensions; and
   (h) removing the adhesive to furnish separate parts coated with abrasive resistant material on the major surfaces thereof.

2. A process of providing thin glass parts having very precise dimensions and no defects in the major surfaces comprising the steps of:
   (a) providing a large sheet of glass having the required thickness and surface perfection;
   (b) coating said sheet of glass with polyvinyl alcohol;
   (c) cutting said coated glass sheet into parts having dimensions substantially larger than the precise dimensions desired;
   (d) applying a microcrystalline wax to said coated parts and stacking said parts into a stack;
   (e) bringing said parts into a substantially parallel relationship and manipulating to expel entrapped air thereby forming an essentially rigid, substantially void-free block of material;
   (f) rough-grinding said stack of parts to slightly larger than the precise dimensions desired; and
   (g) fine-grinding and polishing said stack to the precise dimensions.

3. A process of providing thin glass parts having very precise dimensions and no defects in the major surfaces as set forth in claim 2 having in addition the step of heating the stacks to melt the wax for disassembly after which the remaining wax is removed with trichloroethane.

4. A process of providing thin glass parts having very precise dimensions and no defects in the major surfaces as set forth in claim 3 having in addition the final step of cleaning the glass parts in water to remove the abrasive-resistant material.

5. A process of providing thin glass parts having very precise dimensions and no defects in the major surfaces as set forth in claim 2 wherein the first solvent is a mixture of ethyl alcohol and water.

References Cited

UNITED STATES PATENTS

| | | | |
|---|---|---|---|
| 1,887,565 | 11/1932 | Sherts | 156—104 |
| 2,439,466 | 4/1948 | Gravley | 51—283 |
| 2,387,136 | 10/1945 | Fruth | 51—283 |
| 2,454,777 | 11/1948 | Cronan | 51—283 |
| 2,991,189 | 7/1961 | Rickert | 117—6 |
| 3,056,696 | 10/1962 | Browne | 117—6 |
| 3,114,650 | 12/1963 | Oppenheim et al. | 117—6 |
| 3,475,867 | 11/1969 | Walsh | 51—277X |

OTHER REFERENCES

IBM Technical Disclosure Bulletin, by C. F. Aliotta, p. 47, vol. 7, No. 1, June 1964.

REUBEN EPSTEIN, Primary Examiner

U.S. Cl. X.R.

156—256, 154, 104; 117—11; 51—283